US011570329B2

(12) United States Patent
Tajima et al.

(10) Patent No.: US 11,570,329 B2
(45) Date of Patent: Jan. 31, 2023

(54) TRANSMISSION DEVICE, COMMUNICATION SYSTEM, AND DISPLAY DEVICE

(71) Applicant: Seiko Epson Corporation, Tokyo (JP)

(72) Inventors: Shigeo Tajima, Matsumoto (JP); Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/480,433

(22) Filed: Sep. 21, 2021

(65) Prior Publication Data

US 2022/0094810 A1 Mar. 24, 2022

(30) Foreign Application Priority Data

Sep. 23, 2020 (JP) .............................. JP2020-158617

(51) Int. Cl.
*G06F 3/12* (2006.01)
*H04N 1/32* (2006.01)
*H04L 67/55* (2022.01)

(52) U.S. Cl.
CPC ......... *H04N 1/32368* (2013.01); *H04L 67/55* (2022.05); *H04N 1/32112* (2013.01)

(58) Field of Classification Search
CPC ........... H04N 1/32368; H04N 1/32112; H04N 1/32374; H04L 67/55
See application file for complete search history.

(56) References Cited

U.S. PATENT DOCUMENTS

| 2004/0252338 | A1* | 12/2004 | Oomori | H04N 1/32432 |
| | | | | 358/1.15 |
| 2017/0251126 | A1* | 8/2017 | Fujita | G06K 9/00 |
| 2018/0338054 | A1* | 11/2018 | Fujiwara | H04N 1/00766 |
| 2020/0106895 | A1* | 4/2020 | Okamura | G10L 17/04 |
| 2021/0192490 | A1* | 6/2021 | Smets | G06Q 20/202 |

FOREIGN PATENT DOCUMENTS

| JP | 2004-260306 | 9/2004 |
| JP | 2006-119814 | 5/2006 |
| JP | 2017-151851 | 8/2017 |

* cited by examiner

*Primary Examiner* — Moustapha Diaby
(74) *Attorney, Agent, or Firm* — Workman Nydegger

(57) ABSTRACT

A user personal computer (PC) serves as a transmission device for transmitting data to a terminal device. The user PC includes a user PC communicator, an inputter configured to receive an input of a selection instruction for selecting data to be transmitted by the user PC communicator and an input of a transmission instruction for transmitting data, and a transmission controller configured to control the user PC communicator to transmit data selected by an input received by the inputter and a notification regarding the selected data. The data and the notification regarding the data are transmitted through different communication paths to the terminal device.

11 Claims, 6 Drawing Sheets

TRANSMISSION DEVICE, COMMUNICATION SYSTEM, AND DISPLAY DEVICE

The present application is based on, and claims priority from JP Application Serial Number 2020-158617, filed Sep. 23, 2020, the disclosure of which is hereby incorporated by reference herein in its entirety.

BACKGROUND

1. Technical Field

The present disclosure relates to a transmission device, a communication system, and a display device.

2. Related Art

There are several known technologies of sending a notification that data transmission has started when data is transmitted to a destination. For example, JP-A-2004-260306 discloses an imaging device including control means and transmission start notification means. The control means is configured to, when the imaging device is detected to be located within an area of wireless local area network (LAN) communication, control wireless LAN communication means to transmit image data. The transmission start notification means is configured to, when transmitting image data starts, send a notification that the transmitting image data starts.

However, the transmission start notification means disclosed in JP-A-2004-260306 sends a notification that transmitting image data starts to an owner of the imaging device without sending the notification to the destination. JP-A-2004-260306 does not disclose any method for sending a notification to the destination.

SUMMARY

According to an aspect of the present disclosure, a transmission device for transmitting data to a display device includes a transmitter configured to transmit the data, an input interface configured to receive an input of a selection instruction for selecting the data to be transmitted by the transmitter and an input of a transmission instruction for transmitting the data, and a transmission controller configured to control the transmitter to transmit the data selected in accordance with the selection instruction inputted through the input interface and a notification regarding the selected data. The transmission controller is configured to cause the data and the notification regarding the data to be transmitted through different communication paths to the display device.

According to another aspect of the present disclosure, a communication system includes a transmission device, a document management server, a push notification server, and a display device. The transmission device includes a first transmitter configured to transmit data, an input interface configured to receive an input of a selection instruction for selecting the data to be transmitted by the first transmitter and an input of a transmission instruction for transmitting the data, and a transmission controller configured to control the first transmitter to transmit the selected data, a notification regarding the selected data, and information indicating a destination for the notification regarding the data. The document management server includes a first receiver configured to receive the data transmitted by the transmission device and a memory configured to store the data received by the first receiver. The push notification server includes a second receiver configured to receive the notification regarding the data transmitted by the transmission device and a second transmitter configured to transmit in a push manner the notification regarding the data received by the second receiver in accordance with the information indicating the destination. The display device includes a third receiver configured to receive the notification regarding the data from the push notification server and the data from the document management server, a display controller configured to cause the data and the notification regarding the data that are received by the third receiver to be displayed, and a display configured to display the data and the notification regarding the data under control of the display controller.

According to a further aspect of the present disclosure, a display device is configured to be connected to a document management server for storing data transmitted by a transmission device and a push notification server for receiving a notification regarding the data transmitted by the transmission device. The display device includes a display configured to perform displaying, a receiver configured to receive the data transmitted by the document management server and the notification regarding the data transmitted by the push notification server, and a display controller configured to control the display to display the data and the notification regarding the data that are received by the receiver.

DESCRIPTION OF EXEMPLARY EMBODIMENTS

First Embodiment

Figure 1:
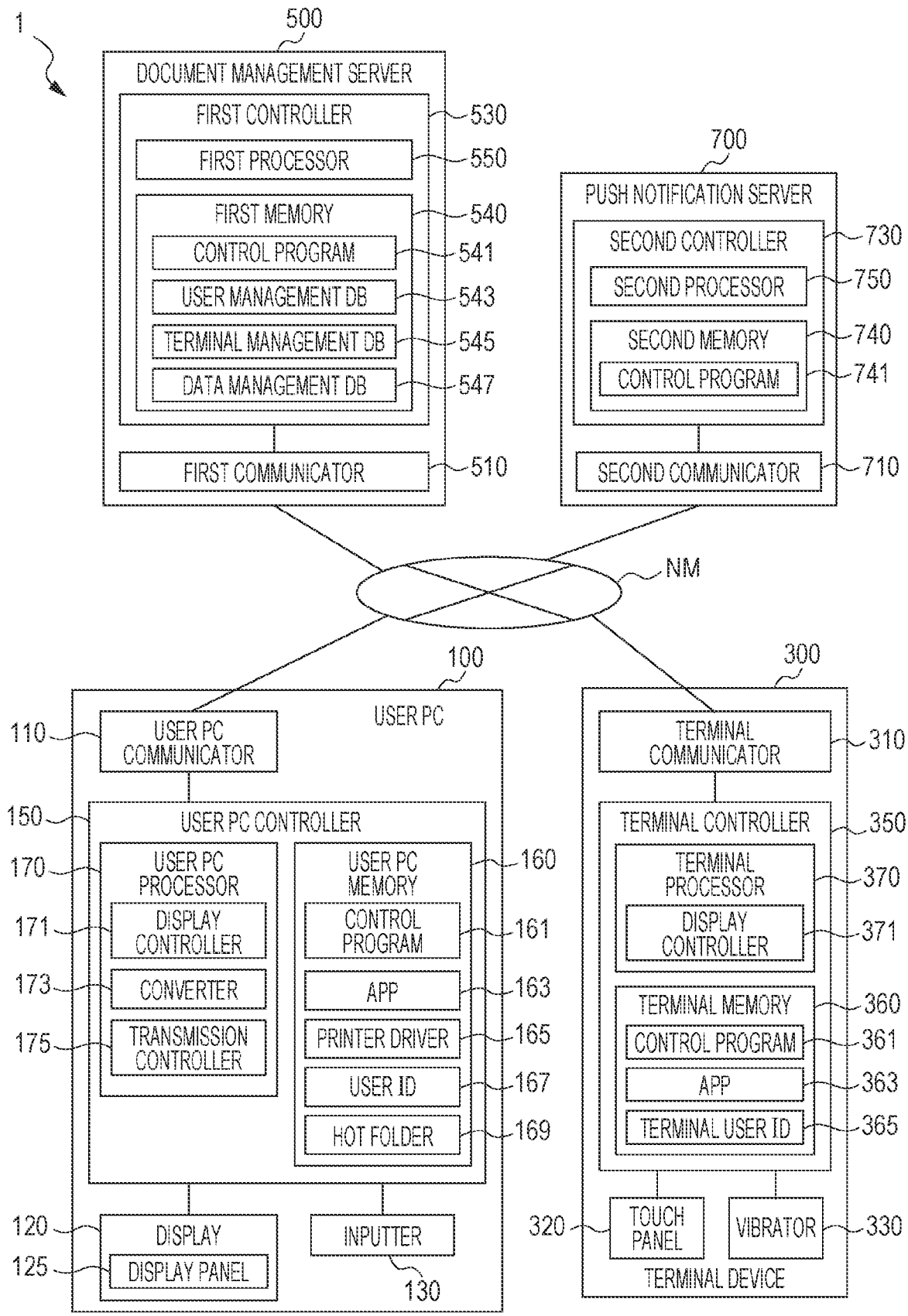
FIG. 1 illustrates a system configuration of a communication system.

FIG. 1 illustrates a system configuration according to the present embodiment. A communication system 1 includes a user personal computer 100 and a terminal device 300, which are possessed by users of the communication system 1, and a document management server 500 and a push notification server 700. In the following description, personal computer is shortly referred to as PC. The user PC 100 and the terminal device 300 may be possessed or used by an identical user or different users.

The user PC 100, the terminal device 300, the document management server 500, and the push notification server 700 are connected to a network NW. The network NW is constituted by, for example, the Internet, dedicated communication lines, mobile communication networks including base stations, and gateways. The dedicated communication lines may include, for example, community antenna television (CATV) lines.

The user PC 100 corresponds to a transmission device. The user PC 100 may be, for example, a desktop, notebook, or tablet computer. The user PC 100 includes a user PC communicator 110, a display 120, an inputter 130, and a user PC controller 150.

The user PC communicator 110 is a communication interface corresponding to a transmitter and a first transmitter. The user PC communicator 110 has a function of wired or wireless communication. The user PC communicator 110 communicates data with the document management server 500 through the network NW.

The display 120 includes a display panel 125 such as a liquid crystal or organic electroluminescent panel. The display 120 has a function of causing the display panel 125 to display an image corresponding to display data inputted by the user PC controller 150. The display 120 may be an external device connected to the user PC 100.

The inputter 130, which corresponds to an example of an input interface, is an interface configured to receive input and coupled to an input device, such as a mouse and a keyboard. The inputter 130 outputs an operational signal corresponding to an input by a user on the input device to the user PC controller 150. The user PC controller 150 performs a processing operation corresponding to the inputted operational signal. Examples of the input by a user on the input device include a selection instruction for selecting a file, which will be described later, and a transmission instruction for providing an instruction to transmit the file. An operational signal representing the selection instruction or the transmission instruction is inputted in accordance with the operation.

The user PC controller 150 includes a user PC memory 160 and a user PC processor 170. The user PC controller 150 controls the individual units of the user PC 100.

The user PC memory 160 is a non-volatile memory. The non-volatile memory may be a semiconductor memory such as a read-only memory (ROM), flash memory, or electrically erasable programmable read-only memory (EEPROM). The user PC memory 160 may include a volatile memory, such as a random-access memory (RAM). The volatile memory can be used as an area for operation by the user PC processor 170. The user PC memory 160 may include an auxiliary storage device, such as a hard disk drive (HDD) or solid state drive (SSD).

The user PC memory 160 stores, for example, a control program 161 such as an operating system (OS), which is to be run by the user PC processor 170, an application program 163, a printer driver 165, and a user ID 167. In the following description, the application program 163 is shortly referred to as the app 163.

The app 163 includes office software for creating document files, such as word files, excel files, and power point files, in accordance with user's inputs. The app 163 includes software for causing the user PC processor 170 to transmit a file stored in a hot folder 169 to the document management server 500 and to transmit information regarding a push notification outputted by the push notification server 700 to the push notification server 700.

The printer driver 165 is driver software for a printer connected to the user PC 100. The printer is not illustrated in the drawing. The user PC processor 170 executes the printer driver 165 to convert a document file to data in a format printable by the printer and output the converted data to the printer. The user PC processor 170 executes the printer driver 165 to convert a file to an image file such as a PDF file and create a thumbnail image that is a reduced-size image of the file.

The user ID 167 is identification information identifying a user of the communication system 1. Different user IDs 167 are assigned to individual users who use the communication system 1.

The hot folder 169 is formed in the user PC memory 160. The user PC controller 150 monitors the hot folder 169 to transmit a file stored in the hot folder 169 in accordance with a user's input or a file processed or stored in the hot folder 169 by the user PC controller 150 to the document management server 500.

The user PC processor 170 is implemented by a microcomputer such as a central processing unit (CPU), a micro controller unit (MCU) equipped with a CPU, or a microprocessor unit (MPU). The user PC controller 150 may be implemented by an integrated circuit such as an application-specific integrated circuit (ASIC) or field-programmable gate array (FPGA).

The user PC controller 150 includes a display controller 171, a converter 173, and a transmission controller 175 as functional blocks. These functional blocks represent functions of the user PC controller 150 implemented by the user PC processor 170 executing the control program stored in the user PC memory 160.

The display controller 171 generates display data for displaying its representation on the display 120 and outputs the generated display data to the display 120. The display 120 displays an image corresponding to the inputted display data on the display panel 125.

When the format of a selected file is not a preset format, the converter 173 executes the printer driver 165 to convert the format of the selected file to the preset format. The preset format is PDF. When the size of a selected file is equal to or larger than a preset size, the converter 173 executes the printer driver 165 to create a thumbnail image that is a reduced-size image of the selected file.

The transmission controller 175 controls the user PC communicator 110 to transmit a file to the document management server 500. When the extension of a file is PDF, the transmission controller 175 transmits the file to the document management server 500. When the extension of a file is not PDF, the converter 173 converts the file format of the file to PDF, and the transmission controller 175 transmits the converted file to the document management server 500.

When the converter 173 generates a thumbnail image, the transmission controller 175 transmits the thumbnail image generated by the converter 173 to the document management server 500 before transmitting the PDF file to the document management server 500. After completing transmission of the thumbnail image, the transmission controller 175 transmits the PDF file to the document management server 500.

Before starting transmission of a file to the document management server 500, the transmission controller 175 transmits the user ID 167 and file attribute information to the document management server 500. The user ID 167 is used for user authentication. The file attribute information is information about a file to be transmitted by the user PC 100 to the document management server 500. The file attribute information includes, for example, a name of the file and a count of pages of the file, that is, the number of pages of the file.

The following is a description of the terminal device 300 corresponding to a display device. The terminal device 300 is a portable terminal such as a smartphone, tablet computer, or notebook computer. The terminal device 300 is owned by a user or provided for a user by a business that the user belongs to. The terminal device 300 includes a terminal communicator 310, a touch panel 320, a vibrator 330, and a terminal controller 350.

The terminal communicator 310 corresponds to a third receiver and a receiver. The terminal communicator 310, which is a communication interface for wireless communication, communicates data with the document management server 500 and the push notification server 700 through the network NW including mobile communication networks.

The touch panel 320 includes a display panel, such as a liquid crystal display panel, and a touch sensor provided on the display panel or in combination with the display panel. The touch sensor detects the position of a touch input and outputs coordinate information indicating the detected position of the touch input to the terminal controller 350. The terminal controller 350 specifies the touch input in accordance with the inputted coordinate information and perform a processing operation corresponding to the specified touch input.

The vibrator 330 vibrates the terminal device 300 with its vibration under the control of the terminal controller 350.

The terminal controller 350 includes a terminal memory 360 and a terminal processor 370. The terminal controller 350 controls the individual units of the terminal device 300. The terminal processor 370 performs processing by reading a program stored in the terminal memory 360. The terminal controller 350 performs various processing operations by using hardware and software.

The terminal memory 360 is a terminal memory for storing, for example, a control program 361 to be executed by the terminal processor 370 and data to be processed by the terminal processor 370. The terminal memory 360 stores, for example, the control program 361 such as an OS, an app 363, and a terminal user ID 365 identifying a terminal user. The terminal user ID 365 may be identical to or different from the user ID 167 stored in the user PC memory 160.

The terminal processor 370 is implemented by a CPU or MPU. The terminal processor 370 controls the individual units of the terminal device 300 by executing the control program 361 and the app 363 stored in the terminal memory 360.

The terminal processor 370 includes a display controller 371 as a functional block. The display controller 371 serves as a function of the terminal controller 350 implemented by the terminal processor 370 executing the control program 361 and the app 363.

The display controller 371 generates display data for displaying its representation on the touch panel 320 and outputs the generated display data to the touch panel 320. The touch panel 320 displays an image corresponding to the inputted display data. The display controller 371 controls displaying on the touch panel 320 serving as a terminal display.

When receiving a push notification from the push notification server 700, the display controller 371 displays the push notification on the touch panel 320. The display controller 371 may display an image converted in accordance with the push notification. The push notification corresponds to a notification regarding data. The push notification displayed by the display controller 371 on the touch panel 320 is information including, for example, a file name of a file received by the document management server 500 from the user PC 100, a count of pages of the file, and a Uniform Resource Locator (URL) indicating the location at which the file is stored.

When a URL is selected by a user's input and an input for requesting download of a file is received, the terminal controller 350 transmits a request for file download to the document management server 500. After transmitting the request for downloading the file, the terminal controller 350 controls the display controller 371 to display an indication such as "Receiving file" on the touch panel 320 until downloading the file from the document management server 500 is completed. After downloading the file from the document management server 500 is completed, the terminal controller 350 controls the display controller 371 to display an indication "File successfully received" on the touch panel 320.

The display controller 371 may change the display appearance of the touch panel 320 in accordance with whether the terminal controller 350 is executing the app 363. While the app 363 is launched and executed by the terminal controller 350, the display controller 371 displays in a pop-up manner an indication that receiving the file is completed on an app screen displayed on the touch panel 320. When the app 363 is not launched, the terminal controller 350 may control the display controller 371 to display an indication that a notification has been received, for example, at an upper right position of an icon representing the app 363 displayed on the touch panel 320.

When downloading the file from the document management server 500 is completed, the terminal controller 350 controls the vibrator 330 to vibrate the terminal device 300 so as to notify the user that downloading the file is completed.

The following is a description of the document management server 500. The document management server 500 includes a first communicator 510 and a first controller 530.

The first communicator 510 is a communication interface corresponding to a first receiver. The first communicator 510 mutually communicates data with devices connected to the network NW in accordance with a given communication standard. The first communicator 510 communicates data with the user PC 100, the terminal device 300, and the push notification server 700.

The first controller 530 includes a first processor 550 and a first memory 540. The first controller 530 controls the individual units of the document management server 500.

The first memory 540 is a memory unit corresponding to a memory. The first memory 540 stores, for example, a control program 541 to be executed by the first processor 550 and data to be processed by the first processor 550. The first memory 540 stores a user management database 543, a terminal management database 545, and a data management database 547. In the following, database is referred to as DB.

The user management DB 543 manages users of the communication system 1. One record of the user management DB 543 includes personally identifiable information such as name, age, gender, and address of a user and a user ID assigned to the user.

The terminal management DB 545 manages the terminal device 300 that is permitted to view or download files recorded on the document management server 500. The recorder user who records a file on the document management server 500 may be identical to or different from the viewer user who is permitted to view or download the file recorded on the document management server 500.

One record of the terminal management DB 545 includes a sender user ID, a destination user ID, and terminal communication information. The sender user ID and the destination user ID are identification information identifying a particular user. The sender user ID may be identical to or different from the destination user ID. The sender user ID is an identification of a recorder user who is permitted to record a file on the document management server 500. The destination user ID is a user ID of a viewer user who is permitted to view and download a file. The sender user ID is identical to the user ID 167 stored in the user PC memory 160. The destination user ID is identical to the terminal user ID 365 stored in the terminal memory 360.

The terminal communication information is used when information is transmitted to the terminal device 300 used by a user of a corresponding destination user ID. The terminal communication information may be a media access control (MAC) address of the terminal device 300 or an email address of the user of the corresponding destination user ID.

The data management DB 547 stores a file transmitted by the user PC 100. One record of the data management DB 547 includes a sender user ID and a file. The file stored in the data management DB 547 may be a PDF file or a PDF file with a thumbnail image.

The first processor 550 is implemented by a CPU or MPU. The first controller 530 may be implemented by an integrated circuit such as an ASIC or FPGA.

When receiving a request for file transmission from the user PC 100, the first controller 530 performs user authentication in accordance with a user ID included in the request for transmitting the file. When user authentication succeeds, the first controller 530 transmits to the user PC 100 a permit for file transmission.

The first controller 530 may create push transmission information included in a push notification before transmitting to the user PC 100 the permit for file transmission. The push transmission information is necessary when the push notification server 700 transmits a push notification to the terminal device 300. The first controller 530 transmits the created push transmission information to the user PC communicator 110. The push transmission information may be transmitted in the state in which the push transmission information is included in a permit for file transmission; alternatively, the push transmission information may be transmitted separately from a permit for file transmission after the permit for file transmission is transmitted and before the user PC 100 transmits the file. The push transmission information includes at least one of the terminal communication information, the file attribute information, and a URL indicating a location at which a corresponding file is stored.

The following is a description of the terminal communication information included in the push transmission information. The first controller 530 recognizes the user ID included in the received request for transmission as a sender user ID and obtains a destination user ID associated with the sender user ID from the terminal management DB 545. The first controller 530 obtains terminal communication information associated with the obtained destination user ID from the terminal management DB 545.

The file attribute information included in the push transmission information is received from the user PC 100. The file attribute information includes, for example, a name of a file and a count of pages of the file.

When receiving a request for file download in accordance with a push notification transmitted by the terminal device 300, the first controller 530 determines whether receiving the file has been completed. When receiving the file has not been completed, the first controller 530 does not transmit a reply to the request for download to the terminal device 300 and reserves the reply for a preset time. When the preset time elapses, the first controller 530 again determines whether receiving the file has been completed. When receiving the file has been completed, the first controller 530 transmits the file corresponding to the request for download to the terminal device 300. When receiving the file has not been completed, the first controller 530 may again reserve the reply for the preset time or transmit to the terminal device 300 a reply indicating that the file is being received.

The following is a description of the push notification server 700. The push notification server 700 includes a second communicator 710 and a second controller 730.

The second communicator 710 is a communication interface corresponding to a second receiver and a second transmitter. The second communicator 710 mutually communicates data with devices connected to the network NW in accordance with a given communication standard. The second communicator 710 communicates with the user PC 100, the document management server 500, and the terminal device 300.

The second controller 730 includes a second processor 750 and a second memory 740. The second controller 730 controls the individual units of the push notification server 700.

The second memory 740 stores, for example, a control program 741 to be executed by the second processor 750 and data to be processed by the second processor 750.

The second processor 750 is implemented by a CPU or MPU. The second processor 750 may be implemented by the second controller 730 or an integrated circuit such as an ASIC or FPGA.

When receiving a push notification from the user PC 100, the second controller 730 transmits a push notification to the terminal device 300. The push notification includes at least either information including a file name of a file that starts being transmitted to the document management server 500 and a count of pages of the file, which is the file attribute information of the file, or a URL indicating a location at which the file is stored.

Figure 2:
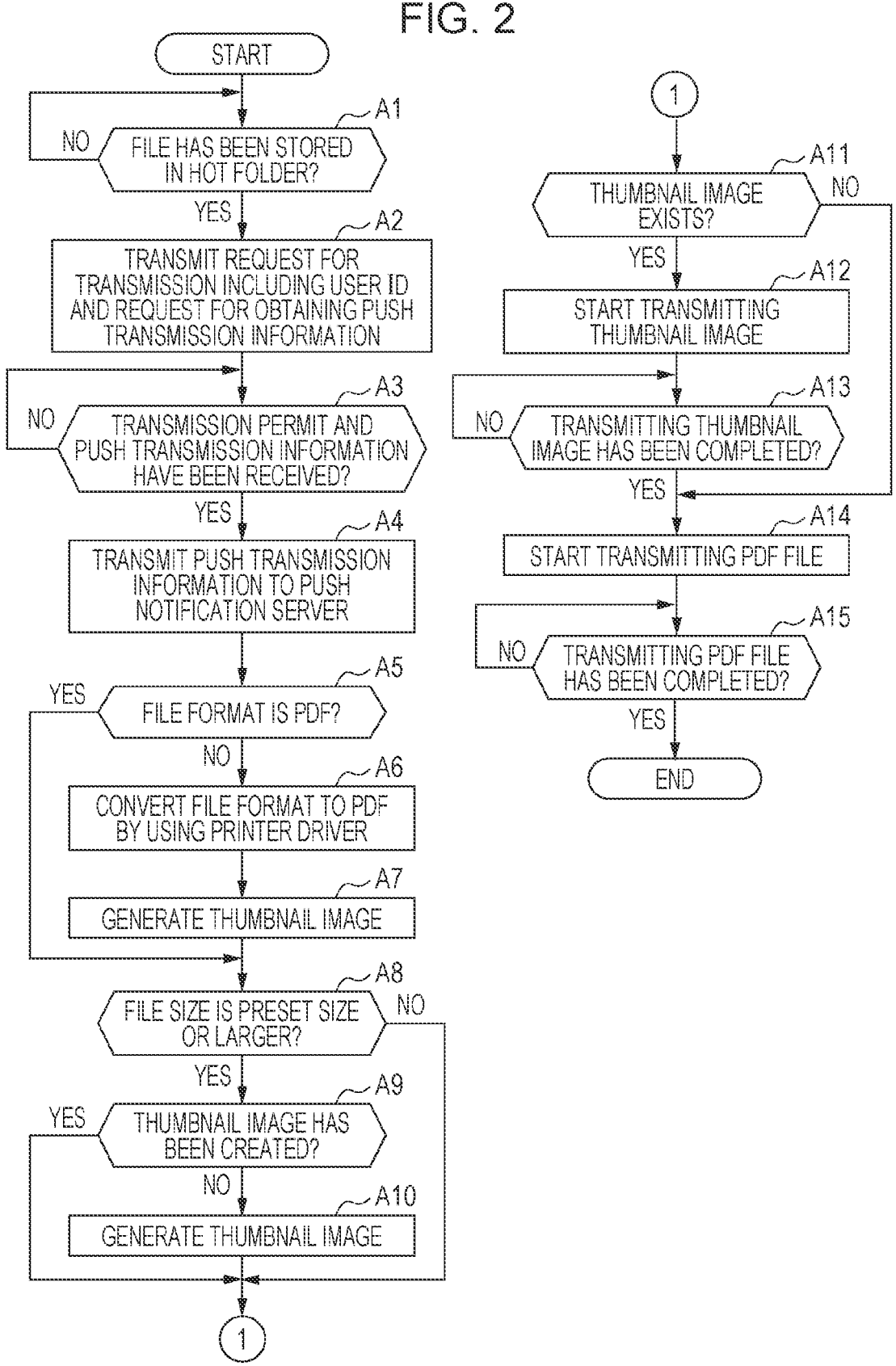
FIG. 2 is a flowchart illustrating an operation of a user personal computer.

FIG. 2 is a flowchart illustrating an operation of the user PC 100. Referring to the flowchart illustrated in FIG. 2, an operation of the user PC controller 150 will be described. The user PC controller 150 refers to the hot folder 169 at a predetermined interval and determines whether any file has been stored in the hot folder 169 (step A1). When no file has been stored in the hot folder 169 (NO in step A1), the user PC controller 150 repeats the determination operation in step A1. When an operational signal indicating that a file is stored in the hot folder 169 is inputted by the user operating the inputter 130, the user PC controller 150 determines that a file has been stored in the hot folder 169 (YES in step A1). The file stored in the hot folder 169 corresponds to a selected file. The operational signal indicating that a file is stored in the hot folder 169 corresponds to a transmission instruction for transmitting data.

After a file has been stored in the hot folder 169 (YES in step A1), the user PC controller 150 transmits a request for transmission including a user ID and a request for obtaining push transmission information to the document management server 500 (step A2).

The user PC controller 150 determines whether a transmission permit and push transmission information have been received from the document management server 500 (step A3). When no transmission permit and no push transmission information have been received from the document management server 500 (NO in step A3), the user PC controller 150 waits until a transmission permit and push transmission information are received. When a transmission permit and push transmission information have been received from the document management server 500 (YES in step A3), the user PC controller 150 transmits the received push transmission information to the push notification server 700 (step A4). The user PC controller 150 may generate the file attribute information included in the push transmission information in accordance with the file stored in the hot folder 169. The terminal communication information is previously obtained from the document management server 500 and stored in the user PC memory 160. After transmitting the push transmission information, the user PC controller 150 moves to a processing operation in step A5.

The user PC controller 150 determines whether the format of the file stored in the hot folder 169 is PDF (step A5). When the format of the stored file is PDF (YES in step A5), the user PC controller 150 moves to a determination operation in step A8.

When the format of the stored file is not PDF (NO in step A5), the user PC controller 150 converts the format of the file to PDF by executing the printer driver 165 (step A6). After converting the format of the file to PDF, the user PC controller 150 creates a thumbnail image of the converted file (step A7).

The user PC controller 150 determines whether the size of the file is equal to or larger than a preset size (step A8). When the size of the file is equal to or larger than the preset size (YES in step A8), the user PC controller 150 determines whether a thumbnail image has been created (step A9). When no thumbnail image has been created (NO in step A9), the user PC controller 150 creates a thumbnail image (step A10). When a thumbnail image has been created (YES in step A9) or when the size of the file is smaller than the preset size (NO in step A8), the user PC controller 150 transmits a request for transmission including the user ID 167 and the file attribute information to the document management server 500. The user PC controller 150 may transmit the request for transmission including the user ID 167 and the file attribute information to the document management server 500 while creating a thumbnail image.

The user PC controller 150 determines whether a thumbnail image of the file to be transmitted to the document management server 500 exists (step A11). When no thumbnail image exists (NO in step A11), the user PC controller 150 moves to a processing operation in step A14.

When a thumbnail image exists (YES in step A11), the user PC controller 150 starts transmitting the thumbnail image to the document management server 500 (step A12). After transmitting the thumbnail image has been completed (YES in step A13), the user PC controller 150 starts transmitting the PDF file (step A14). The user PC controller 150 determines whether transmitting the PDF file has been completed (step A15). When transmitting the PDF file is completed (YES in step A15), the user PC controller 150 ends the processing flow.

Figure 3:
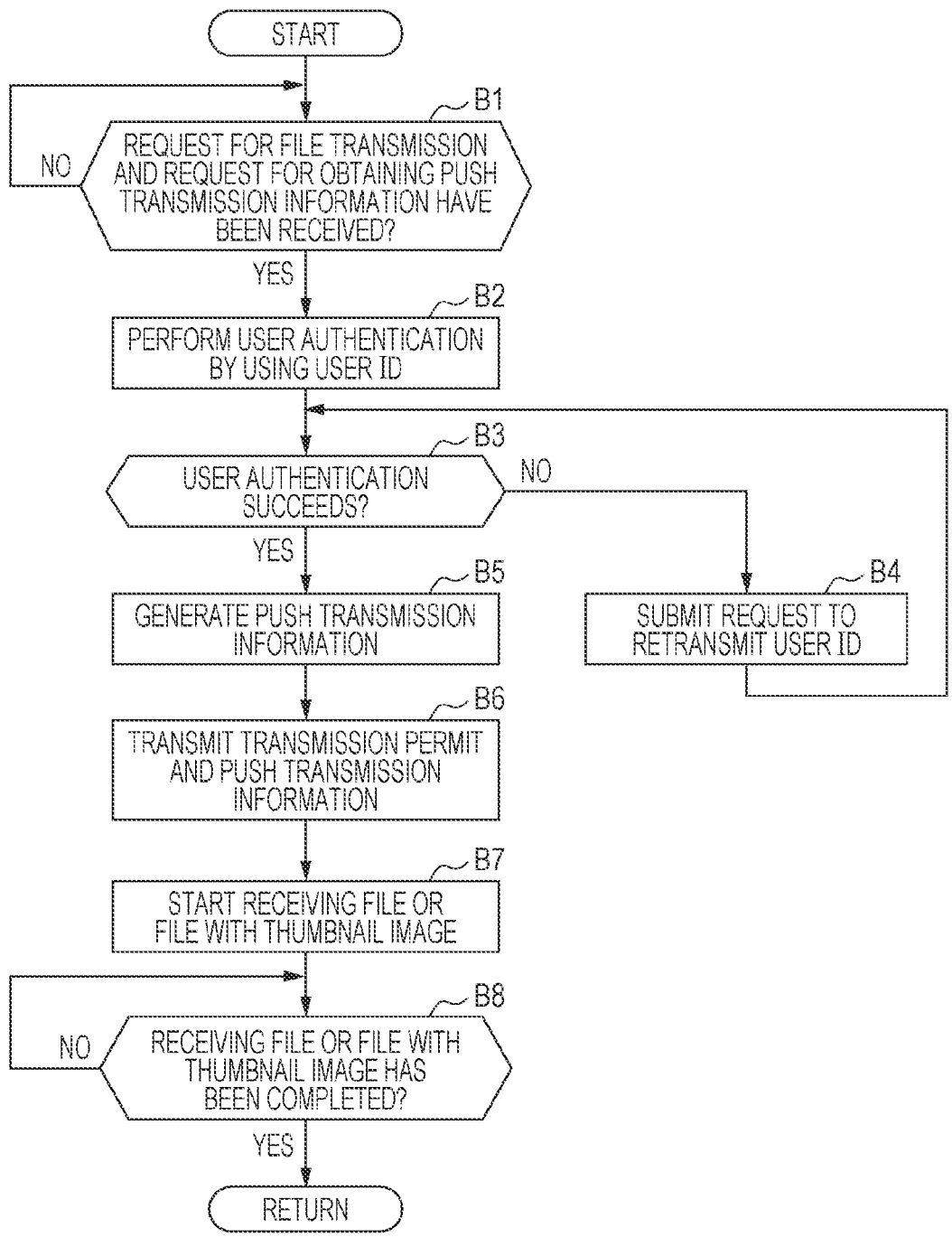
FIG. 3 is a flowchart illustrating an operation of a document management server.

FIG. 3 is a flowchart illustrating an operation of the document management server 500 when the document management server 500 receives a request for file transmission. Referring to the flowchart illustrated in FIG. 3, an operation of the first controller 530 of the document management server 500 when a request for file transmission is received will be described. The first controller 530 determines whether a request for file transmission and a request for obtaining push transmission information have been received from the user PC controller 150 (step B1). When no request for file transmission and no request for obtaining push transmission information have been received (NO in step B1), the first controller 530 repeats the determination operation in step B1 and a determination input for determining whether a request for download is received as illustrated in FIG. 4.

When a request for file transmission and a request for obtaining push transmission information have been received from the user PC 100 (YES in step B1), the first controller 530 performs user authentication in accordance with a user ID included in the request for file transmission (step B2). When user authentication fails (NO in step B3), the first controller 530 requests the user PC 100 to retransmit a user ID again (step B4). When user authentication succeeds (YES in step B3), the first controller 530 generates push transmission information (step B5). The first controller 530 transmits a transmission permit and the push transmission information to the user PC 100 (step B6).

The first controller 530 starts receiving a file or a file with a thumbnail image transmitted from the user PC 100 (step B7). The first controller 530 determines whether receiving a file or a file with a thumbnail image has been completed (step B8). When receiving a file or a file with a thumbnail image has not been completed (NO in step B8), the first controller 530 repeats the determination operation in step B8. When receiving a file or a file with a thumbnail image has been completed (YES in step B8), the first controller 530 ends the processing flow.

Figure 4:
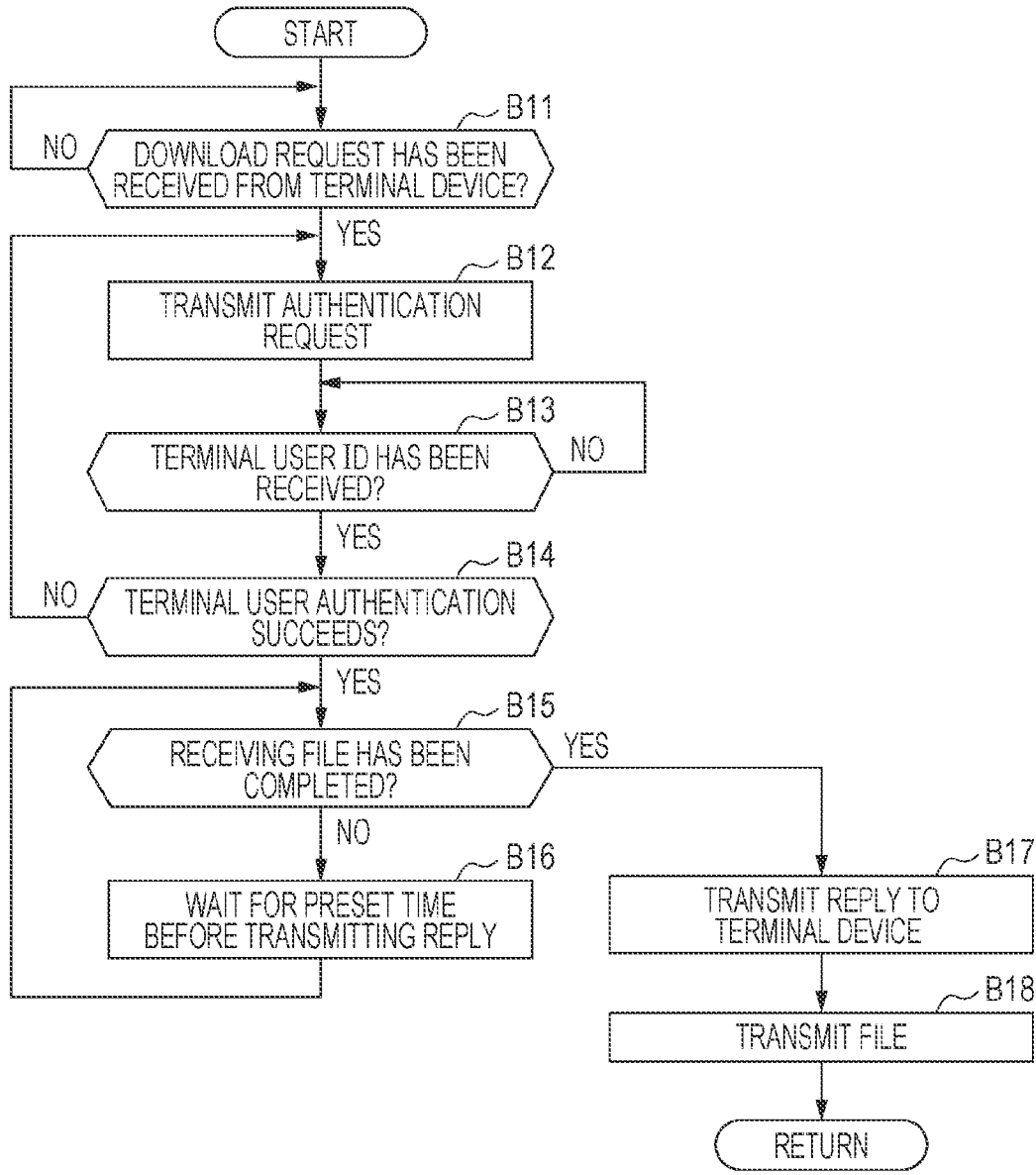
FIG. 4 is a flowchart illustrating an operation of a document management server.

FIG. 4 is a flowchart illustrating an operation of the document management server 500 when the document management server 500 receives a request for download. Referring to the flowchart illustrated in FIG. 4, an operation of the first controller 530 of the document management server 500 when a request for download is received will be described. The first controller 530 determines whether a request for download has been received from the terminal controller 350 (step B11). When no request for download has been received from the terminal device 300 (NO in step B11), the first controller 530 repeats the determination operation in step B11 and the determination input for determining whether a request for file transmission has been received, which is described with reference to FIG. 3.

When a request for download has been received (YES in step B11), the first controller 530 transmits a request for authentication to the terminal device 300 (step B12). After transmitting a request for authentication, the first controller 530 determines whether the terminal user ID 365 has been received from the terminal device 300 (step B13). When the terminal user ID 365 has not been received (NO in step B13), the first controller 530 waits for the subsequent processing until the terminal user ID 365 is received.

The first controller 530 receives the terminal user ID 365 (YES in step B13), and then, the first controller 530 performs terminal user authentication in accordance with the received terminal user ID 365 (step B14). When terminal user authentication fails (NO in step B14), the first controller 530 returns to step B12 and retransmits a request for authentication to the terminal device 300.

When terminal user authentication succeeds (YES in step B14), the first controller 530 determines whether receiving a file, which was started in step B7 in FIG. 3, has been completed (step B15). When receiving a file has not been completed (NO in step B15), the first controller 530 waits for the preset time before transmitting a reply to the terminal device 300 (step B16). The first controller 530 waits for the preset time and again determines whether receiving a file has been completed (step B15). When receiving a file has been completed (YES in step B15), the first controller 530 transmits to the terminal device 300 a reply indicating that transmitting the file starts (step B17) and starts transmitting the file (step B18).

In the flowcharts illustrated in FIGS. 2, 3, and 4, the user PC 100 obtains push transmission information including terminal communication information from the document management server 500, and the user PC 100 transmits the push transmission information including terminal communication information, file attribute information, and a URL to the push notification server 700. When the user PC 100 transmits push transmission information to the push notification server 700, a file and a push notification are transmitted through different communication paths. The file is transmitted from the user PC 100 to the document management server 500 consequently to the terminal device 300. The push notification is transmitted from the user PC 100 to the push notification server 700 consequently to the terminal device 300.

The user PC controller 150 may transmit information indicating processing condition of a file as a push notification to the push notification server 700. When the format of a file to be transmitted to the document management server 500 is being converted to PDF, the user PC controller 150 may transmit information indicating that the file is being converted to PDF as the information indicating processing condition of the file to the push notification server 700. When transmitting a file to the document management server 500 is started, the user PC controller 150 may transmit information indicating that the file is being transmitted as the information indicating processing condition of the file to the push notification server 700. When transmitting a file to the document management server 500 is finished, the user PC controller 150 may transmit information indicating that transmitting the file is completed as the information indicating processing condition of the file to the push notification server 700. The push notification server 700 transmits to the terminal device 300 the information indicating processing condition of the file, which is received from the user PC 100. The terminal device 300 displays on the touch panel 320 information of the processing condition of the file as a push notification. This reduces the user's stress level when it takes time to download a file on the terminal device 300.

The document management server 500 may transmit push transmission information to the push notification server 700. In this case, a file is transmitted from the user PC 100 to the document management server 500 consequently to the terminal device 300. By contrast, a push notification is transmitted from the document management server 500 to the push notification server 700 consequently to the terminal device 300. The terminal device 300 receives the push notification from the push notification server 700 and receives the file from the document management server 500.

Figure 5:
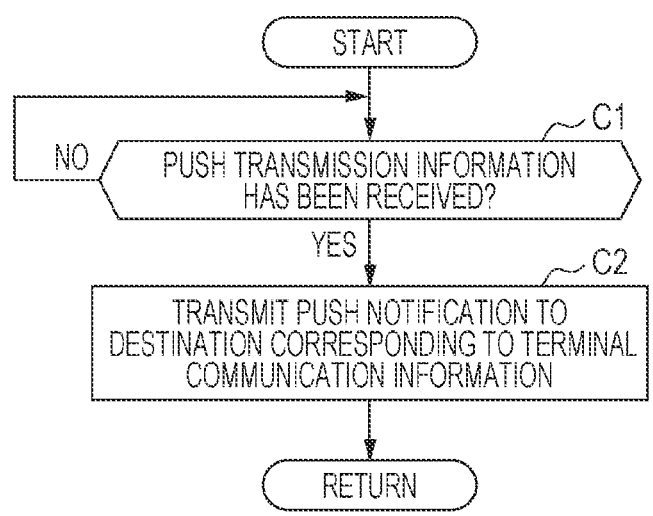
FIG. 5 is a flowchart illustrating an operation of a push notification server.

FIG. 5 is a flowchart illustrating an operation of the push notification server 700. FIG. 5 illustrates an operation of the push notification server 700 when the user PC 100 transmits a push notification to the terminal device 300. Referring to the flowchart illustrated in FIG. 5, an operation of the second controller 730 will be described. The second controller 730 determines whether push transmission information including terminal communication information, file attribute information, and a URL has been received from the user PC 100 (step C1). When no push transmission information has been received from the document management server 500 (NO in step C1), the second controller 730 waits until push transmission information is received.

When push transmission information has been received (YES in step C1), the second controller 730 generates a push notification including a URL and file attribute information, which are included in the push transmission information, and transmits the generated push notification to a destination corresponding to terminal communication information included in the push transmission information (step C2).

Figure 6:
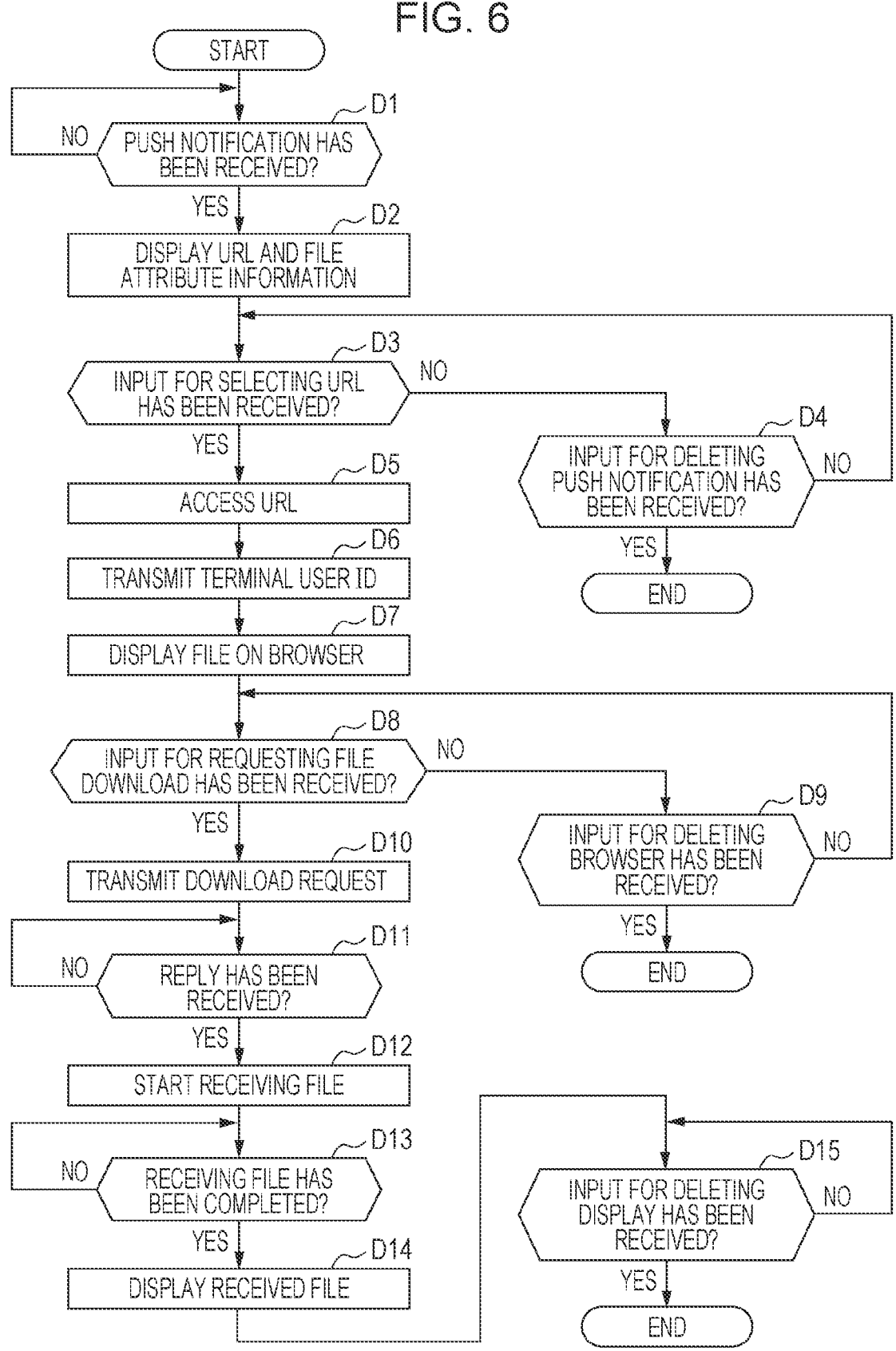
FIG. 6 is a flowchart illustrating an operation of a terminal device.

FIG. 6 is a flowchart illustrating an operation of the terminal device 300. Referring to the flowchart illustrated in FIG. 6, an operation of the terminal controller 350 will be described. The terminal controller 350 determines whether a push notification has been received from the push notification server 700 (step D1). When no push notification has been received (NO in step D1), the terminal controller 350 returns to the determination operation in step D1. When a push notification has been received (YES in step D1), the terminal controller 350 displays on the touch panel 320 a URL and file attribute information included in the received push notification (step D2).

The terminal controller 350 determines whether a touch input for selecting the URL displayed on the touch panel 320 has been received (step D3). When no touch input for selecting the URL has been received (NO in step D3), the terminal controller 350 determines whether an input for deleting the push notification has been received (step D4). When no input for deleting the push notification has been received (NO in step D4), the terminal controller 350 returns to the determination operation in step D3. When an input for deleting the push notification has been received (YES in step D4), the terminal controller 350 ends the processing flow.

When it is determined in step D3 that a touch input for selecting the URL has been received (YES in step D3), the terminal controller 350 accesses the selected URL (step D5). The terminal controller 350 transmits the terminal user ID 365 to the document management server 500 in response to a request from the document management server 500 (step D6). When the document management server 500 succeeds in user authentication, the terminal controller 350 displays on a browser the file stored at a location indicated by the URL (step D7).

The terminal controller 350 determines whether an input for requesting file download has been received (step D8). When no input for requesting file download has been received (NO in step D8), the terminal controller 350 determines whether an input for deleting the browser displayed on the touch panel 320 has been received (step D9). When no input for deleting the browser has been received (NO in step D9), the terminal controller 350 returns to the determination operation in step D8. When an input for deleting the browser has been received (YES in step D9), the terminal controller 350 ends the processing flow.

When it is determined in step D8 that an input for requesting file download has been received (YES in step D8), the terminal controller 350 transmits a request for file download to the document management server 500 (step D10). After transmitting the request for file download, the terminal controller 350 determines whether a reply has been received from the document management server 500 (step D11). When no reply has been received from the document management server 500 (NO in step D11), the terminal controller 350 waits until a reply is received.

When a reply has been received from the document management server 500 (YES in step D11), the terminal controller 350 starts receiving the file transmitted by the document management server 500 (step D12). The terminal controller 350 determines whether receiving the file has been completed (step D13). When receiving the file has not been completed (NO in step D13), the terminal controller 350 waits until receiving the file is completed. When receiving the file has been completed (YES in step D13), the terminal controller 350 displays the received file on the touch panel 320 (step D14).

The terminal controller 350 determines whether an input for deleting the display has been received (step D15). When no input for deleting the display has been received (NO in step D15), the terminal controller 350 waits until a subsequent input is received. When an input for deleting the display has been received (YES in step D15), the terminal controller 350 ends the processing flow.

As described above, the user PC 100, which is a device for transmitting data representing a file to the terminal device 300, includes the user PC communicator 110, the inputter 130, and the transmission controller 175. The inputter 130 receives an input of a selection instruction for selecting data to be transmitted by the user PC communicator 110 and an input of a transmission instruction for transmitting data. The transmission controller 175 controls the user PC communicator 110 to transmit the selected data and a notification regarding the selected data. The data and the notification regarding the data are transmitted through different communication paths to the terminal device 300. Because the data and the notification regarding the data are transmitted through different communication paths to the terminal device 300, it is possible to reduce the effect of transmitting the notification regarding data to the terminal device 300 on the transmission of the data.

The transmission controller 175 causes the document management server 500 to transmit the data and causes the push notification server 700 to transmit the notification regarding data. Because the data and the notification regarding the data are transmitted through different communication paths to the terminal device 300, it is possible to reduce the effect of transmitting the notification regarding data to the terminal device 300 on the transmission of the data.

The transmission controller 175 causes the push notification server 700 to transmit information including the file name of the data and a count of pages of the data as the notification regarding the data. Information regarding data to be transmitted by the user PC 100 to the document management server 500 can be transmitted as a push notification to the terminal device 300.

The user PC 100 includes the converter 173 configured to, when the format of data is not the preset format, convert the format of the data to the preset format. The transmission controller 175 transmits the data converted by the converter 173 to the document management server 500.

The converter 173 generates a reduced-size image of the data. The transmission controller 175 transmits firstly the reduced-size image generated by the converter 173 to the document management server 500 and secondly the data to the document management server 500. As such, the reduced-size image is transmitted prior to the data to the document management server 500. The document management server 500 transmits the reduced-size image firstly received to the terminal device 300, and the terminal device 300 displays the reduced-size image. This reduces the time taken until the user of the terminal device 300 views the data.

The user PC 100 includes the user PC communicator 110, the inputter 130, and the transmission controller 175. The inputter 130 receives a selection instruction for selecting data to be transmitted by the user PC communicator 110 and a transmission instruction for transmitting data. The transmission controller 175 controls the user PC communicator 110 to transmit data selected by an input received by the inputter 130, a notification regarding the selected data, and information indicating a destination for the notification regarding the data.

The communication system 1 includes the user PC 100, the document management server 500, the push notification server 700, and the terminal device 300. The document management server 500 includes the first communicator 510 and the first memory 540. The first communicator 510 receives data transmitted by the user PC 100. The first memory 540 stores the data received by the first communicator 510. The push notification server 700 includes the second communicator 710. The second communicator 710 receives a notification regarding data from the user PC 100. The second communicator 710 transmits in a push manner the received notification regarding data in accordance with information indicating a destination. The terminal device 300 includes the terminal communicator 310 and the display controller 371. The terminal communicator 310 receives a notification regarding data from the push notification server 700 and data indicated by a notification regarding the data from the document management server 500. The display controller 371 controls the touch panel 320 to display the notification regarding data and the data received by the terminal communicator 310.

Because in the communication system 1 the data and the notification regarding the data are transmitted through different communication paths to the terminal device 300, it is possible to reduce the effect of transmitting the notification regarding data to the terminal device 300 on the transmission of the data.

Second Embodiment

In the embodiment described above, at the time when the document management server 500 starts receiving a file from the user PC 100, the user PC 100 transmits push transmission information to the push notification server 700, and the push notification server 700 transmits a push notification to the terminal device 300. In the second embodiment, after the document management server 500 completes receiving a file, a push notification is transmitted to the push notification server 700. Because a push notification is transmitted to the terminal device 300 after the document management server 500 completes receiving a file, it is possible to reduce the waiting time after a push notification is received until downloading the file from the document management server 500 is started.

Third Embodiment

When the size of a file to be transmitted from the user PC 100 to the terminal device 300 is larger than a given size, in some cases it can take time until downloading the file is enabled after the terminal device 300 receives a push notification. When a file is being transmitted to the document management server 500 and the part of the file already transmitted to the document management server 500 equals or exceeds a given size, the user PC 100 may determine that downloading the file is enabled and cause the push notification server 700 to transmit a push notification. When uploading a file on the document management server 500 is completed, the user PC 100 may again cause the push notification server 700 to transmit a push notification. The push notification is not necessarily transmitted via the push notification server 700 to the terminal device 300. The user PC 100 may have a function of the push notification server 700 and transmit a push notification to the terminal device 300.

The embodiments described above illustrate some aspects of the present disclosure and can be changed or used in any manner. The units illustrated in FIG. 1 are mere examples and should not be construed in a limiting sense. Hardware devices are not necessarily provided to implement the respective units, and a single processor can implement the functions of the units by running a program. One or more of the functions implemented by using software may be implemented by using hardware; or one or more of the functions implemented by using hardware may be implemented by using software. In addition, specific configurations of other units of the devices in the communication system 1 can be changed in any manner.

When a program is executed by a computer included in the user PC 100, the program that is executed by the computer may be implemented by using a storage medium or a transfer medium that transfers the program. As the storage medium, a magnetic optical storage medium or semiconductor memory device may be used. Examples of the storage medium include portable or fixed storage mediums such as a flexible disk, a hard disk drive (HDD), a compact disc read-only memory (CD-ROM), a digital versatile disc (DVD), a Blu-ray Disc, a magneto-optical disk, a flash memory, and a card-type storage medium. The storage medium may be a non-volatile storage device, such as a RAM, a ROM, or an HDD, which is an internal storage device included in the server devices. Blu-ray is a registered trademark.

The step units of operations illustrated in FIGS. 2 and 4 are determined by division based on the main processing contents for ease of understanding of the operations of the individual units of the user PC 100, and the present disclosure is not limited by the method of division of processing units or the names of the processing units. Depending on the processing contents, the operations may be divided into step units more than the step units in the embodiment. The division may be performed in a manner in which one step unit includes more processing operations. The order of steps is changeable as appropriate. The same holds for the operation of the document management server 500 illustrated in FIG. 3, the operation of the push notification server 700 illustrated in FIG. 5, and the operation of the terminal device 300 illustrated in FIG. 6.

What is claimed is:

1. A transmission device for transmitting data to a display device, comprising:
    a transmitter configured to transmit the data;
    an input interface configured to receive an input of a selection instruction for selecting the data to be transmitted by the transmitter and an input of a transmission instruction for transmitting the data; and
    a transmission controller configured to control the transmitter to transmit the data selected in accordance with the selection instruction inputted through the input interface and a notification regarding the selected data, wherein
        the transmission controller is configured to cause the data and the notification regarding the data to be transmitted through different communication paths to the display device, and
        the notification regarding the data is transmitted by the transmitter before the data is transmitted by the transmitter, such that the notification regarding the data is transmitted while the data is being processed by the transmission device.

2. The transmission device according to claim 1, wherein the transmission controller is configured to cause
    the data to be transmitted to a document management server, and
    the notification regarding the data to be transmitted to a push notification server.

3. The transmission device according to claim 2, wherein the notification regarding the data is information including a file name of the data and a count of pages of the data.

4. The transmission device according to claim 2, further comprising:
    a converter configured to, when a data format of the data is not a preset format, convert the data format of the data to the preset format, wherein
    the transmission controller is configured to cause the data converted by the converter to be transmitted to the document management server.

5. The transmission device according to claim 4, wherein
    the converter is configured to generate a reduced-size image of the data, and
    the transmission controller is configured to cause the reduced-size image generated by the converter to be transmitted to the document management server before causing the data to be transmitted to the document management server.

6. A communication system comprising:
    a transmission device including
        a first transmitter configured to transmit data,
        an input interface configured to receive an input of a selection instruction for selecting the data to be transmitted by the first transmitter and an input of a transmission instruction for transmitting the data, and
        a transmission controller configured to control the first transmitter to transmit the selected data, a notification regarding the selected data, and information indicating a destination for the notification regarding the data, wherein the notification regarding the selected data is transmitted by the first transmitter before the data is transmitted by the first transmitter, such that the notification regarding the selected data is transmitted while the data is being processed by the transmission device;
    a document management server including
        a first receiver configured to receive the data transmitted by the transmission device, and
        a memory configured to store the data received by the first receiver;
    a push notification server including
        a second receiver configured to receive the notification regarding the data transmitted by the transmission device, and
        a second transmitter configured to transmit in a push manner the notification regarding the data received by the second receiver in accordance with the information indicating the destination; and
    a display device including
        a third receiver configured to receive the notification regarding the data from the push notification server and the data from the document management server,
        a display controller configured to cause the data and the notification regarding the data that are received by the third receiver to be displayed, and a display configured to display the data and the notification regarding the data under control of the display controller.

7. The communication system according to claim 6, wherein
the notification regarding the data is information regarding processing condition of the data.

8. The communication system according to claim 6, wherein
the notification regarding the data is information including a file name of the data and a count of pages of the data.

9. The communication system according to claim 6, wherein
the transmission device further includes a converter configured to, when a data format of the data is not a preset format, convert the data format of the data to the preset format, and
the transmission controller is configured to cause the data converted by the converter to be transmitted to the document management server.

10. The communication system according to claim 9, wherein
the converter is configured to generate a reduced-size image of the data, and
the transmission controller is configured to cause the reduced-size image generated by the converter to be transmitted to the document management server before causing the data to be transmitted to the document management server.

11. A display device configured to be connected to a document management server for storing data transmitted by a transmission device and a push notification server for receiving a notification regarding the data transmitted by the transmission device, the notification regarding the data being transmitted by the transmission device before the data is transmitted by the transmission device, such that the notification regarding the data is transmitted while the data is being processed by the transmission device, the display device comprising:
a display configured to perform displaying;
a receiver configured to receive the data transmitted by the document management server and the notification regarding the data transmitted by the push notification server; and
a display controller configured to control the display to display the data and the notification regarding the data that are received by the receiver.

* * * * *